H. LOFQUIST.
MACHINE FOR WASHING PLATES, KNIVES, FORKS, AND THE LIKE.
APPLICATION FILED JULY 28, 1914.
1,189,707. Patented July 4, 1916.
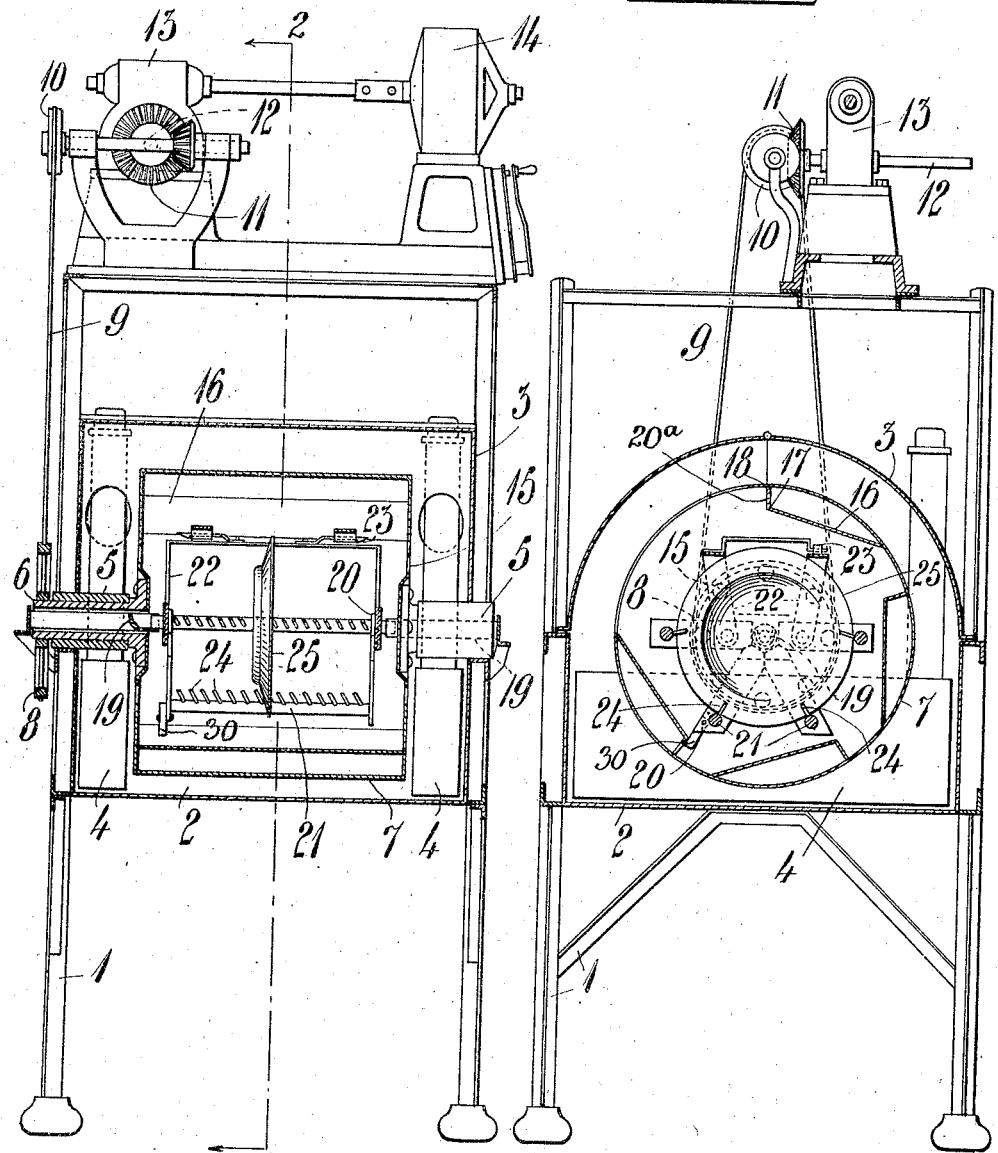

UNITED STATES PATENT OFFICE.

HJALMAR LOFQUIST, OF STOCKHOLM, SWEDEN.

MACHINE FOR WASHING PLATES, KNIVES, FORKS, AND THE LIKE.

1,189,707.

Specification of Letters Patent.  Patented July 4, 1916.

Application filed July 28, 1914.  Serial No. 853,733.

*To all whom it may concern:*

Be it known that I, HJALMAR LOFQUIST, a subject of the King of Sweden, residing at Birger Jarlsgatan 21, Stockholm, Sweden, have invented new and useful Improvements in Machines for Washing Plates, Knives, Forks, and the like, of which the following is a specification.

The present invention relates to a machine for washing plates, knives, forks, and like articles of the kind comprising a rotary water drum the sides of which are so formed as to cause a vigorous circulation of the water upon the articles to be washed, the latter being contained in a cage or basket suitably suspended in said drum.

The object of the present invention is to provide an improved construction of machine in which a particularly strong splashing action of the water upon the articles is obtained whereby the latter are effectively cleansed.

According to the invention the interior wall of the rotary drum is provided with a series of flat surfaces so arranged as to form projecting angles and also recesses, whereby a strong splashing motion of the water admitted into the drum is obtained which facilitates the cleansing of the articles. The articles are preferably contained in a basket in the drum which may rotate with the drum or may be stationary, bearings open at the top being provided for the basket whereby it will be easy to introduce and remove same. The drum is preferably open on a part of its periphery for facilitating the introduction of the basket and also for effecting a change of water in the drum from a surrounding stationary receptacle or container.

To enable the invention to be fully understood it will now be described by reference to the accompanying drawings, in which:—

Figure 1 is a part sectional elevation of one form of washing machine constructed according to the invention and Fig. 2 is a section on the line 2—2 in Fig. 1.

As shown in the drawings, a frame 1 supports a receptacle 2 for washing water, said receptacle being provided with a cover 3, preferably semi-cylindrical and hinged at the center so that it can be opened by swinging one portion upward. In said receptacle, a pair of heating elements 4, which may be electric, may be arranged for heating the water therein. Bearings 5 are carried in the walls of the receptacle for receiving the hollow journals 6 of a rotary drum 7, which can be rotated by means of a pulley 8, secured to one of the hollow journals 6 outside the receptacle 2. The pulley 8 is actuated by means of a belt 9 from a pulley 10, driven by means of a bevel wheel 11 on a shaft 12 which latter is driven by means of worm and wheel or like gear contained in a casing 13 by an electric motor 14. The shaft 12, in the form shown, is extended (Fig. 2) for the purpose of driving other simultaneously working machines for analogous purposes, such for instance as a knife polishing machine. The arrangement of the driving gear, however, may be varied in several ways.

The drum 7, in the form shown, is open for about one fifth of its periphery to enable the plates and the like to be introduced, and also to facilitate the changing of the water in the drum. For the latter purpose, holes 15 may also be provided in the end walls of the drum. Around the interior of the drum, four angularly bent plates or bars 16 are arranged so shaped that the free space in the interior of the drum is provided with projecting angles or portions 17, and recesses 18 formed by the sides 20ª as shown. By reason of this arrangement, the water in the rotating drum receives an intense and vigorous splashing motion, especially at the moments when the angles 17 and recesses 18 pass the water surface, said passage causing, especially if the sides 20ª as shown, are substantially radial, a rapid displacement of the upper water layers in one direction or the other with an accompanying splash. It has been found, that even at a moderate speed of the drum (about 10–20 revolutions per minute) such an intense motion of the water is obtained, that as large a quantity of plates or the like as the basket can hold can be completely cleansed in about 3 minutes.

Stationary bearings for the frame or basket carrying the plates or the like, project into the hollow journals 6 of the drum and these bearings are preferably open at the top for facilitating the introduction of the basket in the known manner. In the form shown, they simply consist of substantially U-shaped irons 19 of a suitably curved profile. The basket placed therein is preferably so arranged as to be carried around with the rotation of the drum for instance provided with a finger 30 engaging a projecting surface of the drum, but it may be stationary if desired. The shape of the basket may be varied in many ways, according to the objects to be carried therein.

As here shown the ends of the basket for receiving the plates consist of pieces 20 arranged in star shape and connected together by longitudinal bars 21. Four arms of these end pieces 20 are fixed but two arms are pivotally mounted as shown so that they can be pressed apart to allow the plates to be introduced. These pieces 22 are locked in the closed position by means of suitable latches 23. Pins 24 are arranged on the bars 21 for guiding the plates 25, one plate being shown at 25. The basket shown is adapted for 15 plates. It will be obvious that various methods of forming the polygonal interior of the drum may be adopted.

Having now particularly described the nature of my invention and the manner of its operation, what I claim is:

1. In a washing machine, a drum having in the interior a series of flat surfaces so arranged as to provide projecting angles and also recesses, said recesses being bounded by the wall of the drum and by a side which is substantially radial to the center of the drum, means for supporting plates, knives, forks and the like within said drum, said means being adapted to be rotated with the drum, and means for rotating said drum.

2. In a washing machine, a frame, a receptacle supported thereby, a semi-cylindrical cover for said receptacle and having a hinged portion adapted to be opened for obtaining access to the receptacle, said receptacles being adapted to contain washing water, heating means mounted in the receptacle, bearings at opposite sides of the receptacle, a drum positioned in the receptacle and having rigid hollow journals projecting through said bearings, a motor having operative connections with one of said journals for rotating said drum, means for obtaining access to the interior of the drum, deflectors on the inner surface of the drum, said drum having openings therethrough to permit the free circulation of the washing water therethrough, stationary bearings mounted in said hollow journals, a basket contained within the drum and supported at opposite sides in said stationary bearings, said basket being adapted to be opened and closed, and for supporting articles to be cleansed therein, and means between the drum and basket for causing the latter to be rotated therewith.

3. In a washing machine, a drum having in the interior a series of flat surfaces, hollow journals for said drum, stationary bearings projecting inward through said journals, a basket for supporting plates, knives, forks and the like resting in said bearings, and means for rotating the drum.

4. In a washing machine, a drum having in the interior a series of flat surfaces, hollow journals for said drum, stationary open bearings projecting inward through said journals, a basket for supporting plates, knives, forks and the like, adapted to be journaled in said open bearings, and means for rotating the drum.

5. In a washing machine, a drum having in the interior a series of flat surfaces, hollow journals for said drum, stationary bearings projecting inward through said journals, a basket for supporting plates, knives, forks and the like resting in said bearings and engaging said drum so as to be carried around thereby in rotating, and means for rotating said drum.

6. In a washing machine, a drum, projections upon the interior surface of the drum, journals supporting said drum, bearings engaged in said journals, a basket for supporting plates and the like, resting in said bearings, said basket comprising two end pieces consisting of arms arranged in the shape of a star, bars horizontally connecting said arms in opposed pairs, said bars having spaced guiding pins for the plates and the like, two of the arms of each end piece being pivoted to other of the arms to allow the same to be pressed apart to open the basket for inserting the plates and the like therein, and moved together to prevent displacement of the plates and the like, means to connect said pivoted arms to hold the same from separating movement, and means for rotating the drum.

In testimony whereof I have signed my name to this specification in the presence of two subscribing witnesses.

HJALMAR LOFQUIST.

Witnesses:
 BIRGER NORDFELDT,
 GICTA PIREN.